(12) United States Patent
Marsh et al.

(10) Patent No.: US 6,308,042 B1
(45) Date of Patent: *Oct. 23, 2001

(54) COMPUTER BASED TRAINING SYSTEM

(75) Inventors: Thomas Gerard Marsh; Ciaran Anthony O'Connell, both of Dublin (IE)

(73) Assignee: CBT (Technology) Limited, Dublin (IE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,275

(22) Filed: Jan. 8, 1998

Related U.S. Application Data

(63) Continuation of application No. 08/472,489, filed on Jun. 7, 1995, now abandoned.

(30) Foreign Application Priority Data

Jun. 7, 1994 (IE) .................................................. S940460

(51) Int. Cl.[7] ...................................................... G09B 5/00
(52) U.S. Cl. ..................... 434/307 R; 434/118; 434/365; 348/423.1; 345/352
(58) Field of Search ................................... 434/322, 323, 434/118, 350–358, 307 R, 362, 308, 365; 345/145, 146, 156, 173, 326, 340, 348, 351, 352, 358, 978; 348/423.1, 467; 375/240.03, 240.14, 240.15, 240.16; 700/86, 88; 707/10, 104, 513; 709/218, 318, 370; 386/112, 120

(56) References Cited

U.S. PATENT DOCUMENTS

| | | | | |
|---|---|---|---|---|
| 4,295,831 | * | 10/1981 | Matt | ...................................... 434/118 |
| 4,599,611 | * | 7/1986 | Bowker et al. | ....................... 345/116 |

(List continued on next page.)

FOREIGN PATENT DOCUMENTS

| | | | |
|---|---|---|---|
| 2093839 | 1/1994 | (CA) | ............................... G06F/13/20 |
| 2107499 | 5/1994 | (CA) | ................................ G06F/7/02 |

(List continued on next page.)

OTHER PUBLICATIONS

R. Davies et al. "Multi–Media Software for Teaching Discrete Event Simulation", Dec. 12, 1993; *Proceedings of the Winter Simulation Conference*, Los Angeles, No. —, pp. 1313–1318, Instit. of Electrical and Electronics Engineers XP000479651.

J.G. Goble "Simobject: From Rapid Prototype to Finished Model—A Breakthrough in Graphical Model Building" Dec. 12, 1993, *Proceedings of the Winter Simulation Conference*, No. —, pp. 233–236, Instit. of Electrical and Electronics Engineers XP00047951.

*Primary Examiner*—Joe H. Cheng
(74) *Attorney, Agent, or Firm*—Jacobson Holman, PLLC

(57) ABSTRACT

A training system (1) has various media for interfacing with a user. A system controller (2) uses an interface file (17) to automatically execute action commands to perform an interfacing event. The action commands are delimited by interactivity point commands, execution of which halts an execution path and allows interactive inputs. A simulation program (19) may then be retrieved to allow the controller (2) simulate interfacing of the training subject. Screen controls are dynamically linked with simulation handlers of the simulation program. They are all disconnected after use of a simulation program. A combination of automatic interfacing and interactivity is achieved in a simple way for effective user training.

18 Claims, 10 Drawing Sheets

U.S. PATENT DOCUMENTS

| | | | |
|---|---|---|---|
| 4,622,013 | * 11/1986 | Cerchio | 434/118 |
| 4,652,240 | * 3/1987 | Wackym | 434/118 |
| 4,701,130 | * 10/1987 | Whitney et al. | 434/118 |
| 4,715,818 | * 12/1987 | Shapiro et al. | 434/118 |
| 4,772,206 | * 9/1988 | Kerr et al. | 434/118 |
| 4,877,404 | * 10/1989 | Warren et al. | 434/118 |
| 5,117,496 | * 5/1992 | Stearns et al. | 709/320 |
| 5,185,818 | * 2/1993 | Warnock | 382/112 |
| 5,199,068 | * 3/1993 | Cox | 380/23 |
| 5,252,951 | * 10/1993 | Tannenbaum et al. | 345/156 |
| 5,311,422 | * 5/1994 | Loftin et al. | 364/401 |
| 5,317,688 | * 5/1994 | Watson et al. | 395/161 |
| 5,326,270 | * 7/1994 | Ostby et al. | 434/118 |
| 5,388,993 | * 2/1995 | McKeil et al. | 434/118 |
| 5,432,940 | * 7/1995 | Potts et al. | 395/700 |
| 5,440,345 | * 8/1995 | Shimoda | 375/240.14 |
| 5,574,843 | * 11/1996 | Gerlach, Jr. | 395/118 |
| 5,616,033 | * 4/1997 | Kerwin | 434/322 |
| 5,694,173 | * 12/1997 | Kimura et al. | 348/423.1 |

FOREIGN PATENT DOCUMENTS

| | | | |
|---|---|---|---|
| 0 096 627 | 5/1983 | (EP) | . |
| 0 239 884 | * 7/1987 | (EP) | G09B/5/06 |
| 0239884 | 10/1987 | (EP) | G09B/5/06 |
| 0 352 908 | 6/1989 | (EP) | . |
| 0 498 106 | 10/1991 | (EP) | . |
| 0453152 | 10/1991 | (EP) | G06F/9/44 |
| 0 518 554 | 6/1992 | (EP) | . |
| 0513553 | 11/1992 | (EP) | G06F/9/44 |
| 2 113 887 | 8/1983 | (GB) | . |
| 2 175 470 | 11/1986 | (GB) | . |
| 2175471 | 11/1986 | (GB) | H03L/7/00 |
| 92/20059 | 11/1992 | (WO) | . |
| 9222869 | 12/1992 | (WO) | G06F/15/00 |
| 9406074 | 3/1994 | (WO) | G06F/3/023 |

* cited by examiner

FIG. 7

Written text :

Lotus Notes is a client/server implementation of openly distributed documentation databases.

Audio text :

125

Graphic :

Comments :

Graphic name :

Question :

Palette information :

Kernel command :

Written text :

Lotus Notes is a client/server implementation of openly distributed documentation databases.

Audio text :

Graphic :

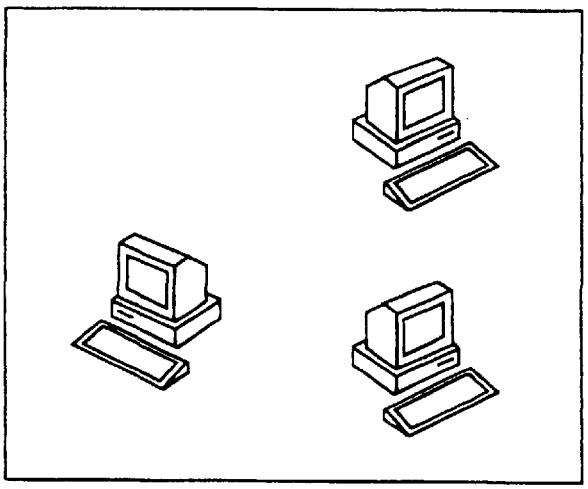

Comments :

This whole topic is presented on the conceptual screen interface.

Footnote material on types of notes applications is available throughout this entire topic.

As this opening topic is really a reflection back to BNC, the imagery should be similar to opening imagery there.

The PC screens start off black at this point

Graphic name : a 01-101.pex

Question :

Palette information :

Kernel command :

COMPUTER BASED TRAINING SYSTEM

This is a continuation of application Ser. No. 08/472,489, filed Jun. 7, 1995, now abandoned.

FIELD OF THE INVENTION

The invention relates to computer based training systems and their production. More particularly, the invention relates to the underlying technical control features of the system and to the technical aspects of production of such a system.

PRIOR ART DISCUSSION

British Patent Specification No. GB 2,113,887 (Cubic Corporation) and European Patent Specification No. EP 96627 (DEC) both relate to computer based training systems. In both cases, there is much emphasis on the input and output aspects such as the use of a touch panel, and little discussions of the core control aspects. In general, there has been a trend in recent years to provide more sophisticated input and output media such as higher-resolution screens, stereo audio devices, touch screen technology for inputs, microphone inputs and various other input and output devices. Further, effective programs have been developed to provide for efficient control of data inputs and outputs using such devices. For example, PCT Patent Specification No. WO 92/20059 (Matsushita) describes a demonstration control system having the ability to record, annotate and playback a graphic display. British Patent Specification No. GB 2,175,470 describes a video display controller which is particularly directed to providing overlays from diverse sources. European Patent Specification Nos. EP 518,554 and 498,106 (Adobe Systems) relate to control of pixels for generation of clear displays. The trend has therefore been towards providing a wide range of programs and hardware devices which are efficient at performing particular communication tasks.

However, the end user of a computer based training system must be provided with a wide range of different outputs and must have ample opportunity to provide interactive inputs in order to provide training feedback and also to possibly change the direction of operation of the system. Heretofore, this has led to the use of complex control programs, sophisticated interrupt handlers and program switching mechanisms, etc. Such arrangements generally provide a slow response time, provide relatively little flexibility for the end user. From the production point of view, such systems are difficult to modify for further version releases. An example of the system control approach which has been taken is described in European Patent Specification No. 352,908 (Hewlett-Packard). In this system, a processor means receives messages which indicate syntactic actions taken by the user and generates semantic commands. Another processor means receives the semantic commands and executes them and an instruction object is responsive to the syntactic actions taken by the user and displays information on a monitor. An agent means sends sematic commands to the instruction object to indicate which information to display on the monitor and for intercepting semantic commands sent from the first action processor to the first command processor. In summary, a shell is provided to teach skills for a live training subject application. This considerably limits the range of training options which may be used. Further, such a system appears to provide relatively little scope for integration of a wide variety of media devices in a flexible way for effective user training.

OBJECTS OF THE INVENTION

The invention is directed towards providing a computer based training system which:

(a) has the ability to clearly communicate information to the user, including feedback and responses to user inputs, and (b) the ability to provide a wide range of training choices to the user and to easily switch between different modes of operation.

The technology involved in providing input and output media is advancing very quickly, and the thrust of the invention is therefore towards providing the underlying technical control steps to maximise utilisation of these devices for effective training.

The invention is also directed towards providing a process for producing a computer based training system, the process utilising features of the end product training system for efficient and flexible production.

SUMMARY OF THE INVENTION

The invention provides a computer based training system comprising a user input means, a system controller, a storage means storing training data, and a user output means including a video screen. The storage means stores independently addressable media records having media interface data. The storage means also stores an interface file comprising a series of interface action commands, each action command being associated with a media record and comprising code for instructing an interfacing action to be performed using data retrieved from the record. Further, the system controller comprises means for:

identifying a sequence of action commands which are associated with an interfacing event, being an event which the system performs automatically between interactivity points at which a user may input a signal;

automatically performing interfacing actions according to said sequence of action commands to perform an event; and receiving a user input signal at an interactivity point after completing the event, acting in response to the received input signal, and subsequently identifying action commands for the next event and performing said event to continue an execution path sequentially using commands in the interface file.

In one important aspect, the interface file further comprises interactivity point commands which delimit sequences of action commands for events, and the system controller comprises means for recognising said interactivity point commands and directing interactivity inputs according to said commands.

Preferably, the system controller comprises means for directing retrieval of training programs at an interactivity point and for operating according to the training programs before returning to the execution path of the interface file at the next action command. An important aspect of the invention is that the training programs may include simulation programs having code for directing the system controller to perform operations simulating interfacing operations of the training subject.

The training subject may, for example, be a computer application such as Lotus Notes™. It has been found that by integration of simulation operations in the overall system operation in this manner, information is clearly communicated to the user and there is ample opportunity for interactivity inputs.

According to another aspect, the invention provides a method of producing data and programs for loading in a target computer to provide a computer based training system, the method comprising the steps of:

storing a master media data document having flags;

generating a memory storyboard having a cellular structure in which there are groups of cells, each group associated with an interfacing event of the target computer, and each of the cells within a group being individually addressable;

a production controller reading the master media data document, recognising flags within the document, and pre-assigning each cell to an interfacing action according to the flags;

automatically transferring media data from the master media data document to relevant pre-assigned cells within the storyboard;

processing each cell of the storyboard in turn to generate an interface file having action commands associated with cells of the storyboard, each action command comprising code for directing an interfacing action of a training system with respect to an associated cell;

generating a set of media records storing media data also stored in cells of the storyboard; and combining said media records and said interface file together with a training system control program.

By automatic operation using commands of the interface file, the training system operates extremely quickly to provide a wide variety of media output and media interfacing actions generally. Interactivity inputs are provided for in a very simple and flexible manner with a wide range of options provided to a user. What, in effect, has been achieved is automatic sequential processing within the training system, with the facility given to the user that he or she may provide input to re-direct or alter in many ways the training session at apparently any point in it's operation. These underlying technical features also apply to the production method, particularly as the interface file forms an integral part of both the end product training system and the production method. At the very beginning of the production method, individual interfacing actions are identified and recorded in the storyboard cells and these are then used to produce the interface file. Broadly speaking, the production method could be viewed as a reverse of the end product operation.

BRIEF DESCRIPTION OF THE DRAWINGS

The invention will be more clearly understood from the following description of some embodiments thereof, given by way of example only, with reference to the accompanying drawings, in which:

FIGS. 7 and 8 are representations of sample groups of storyboard cells used in the production method;

DETAILED DESCRIPTION OF THE INVENTION

Figure 1:
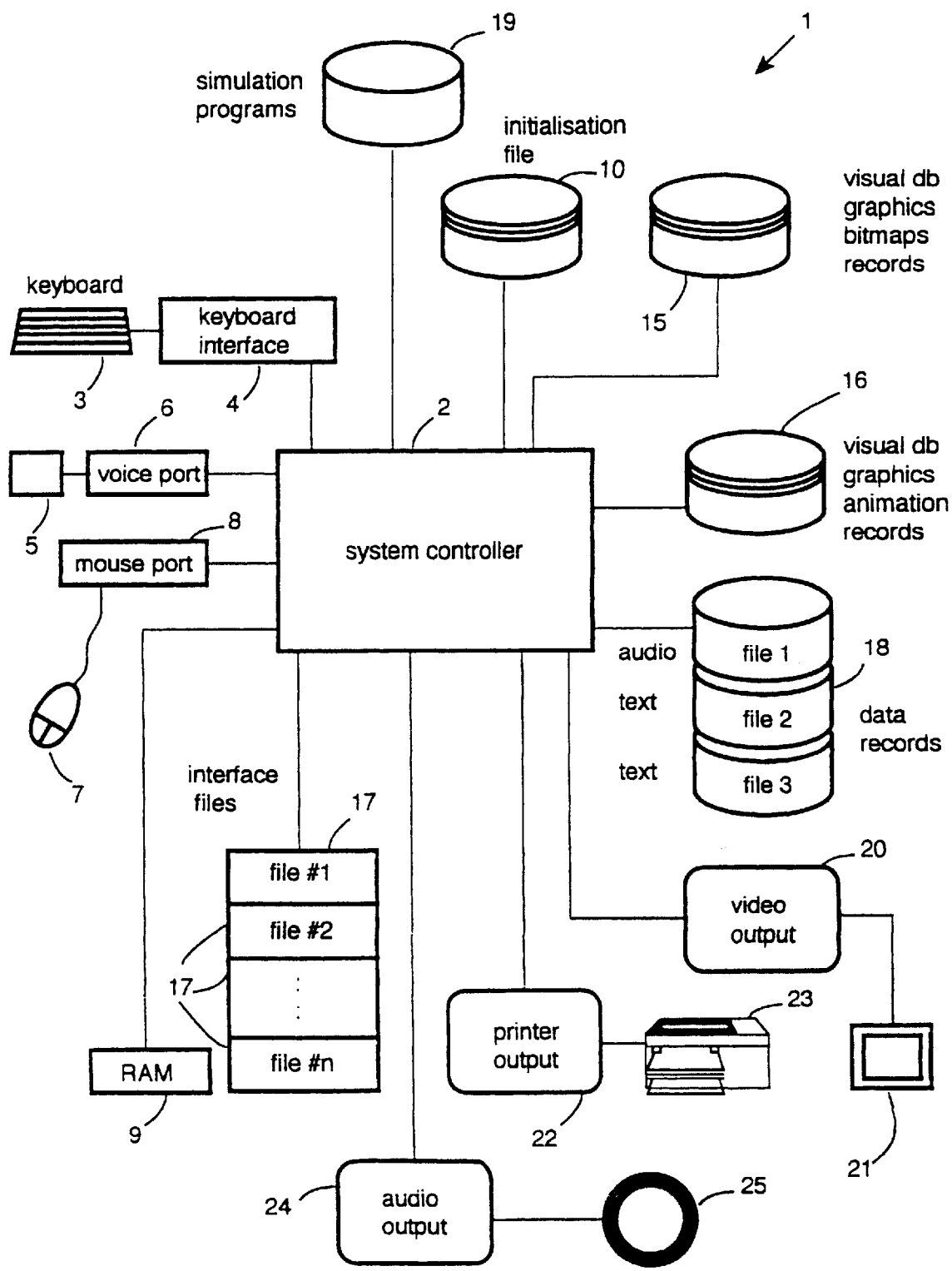
FIG. 1 is a schematic overview of a computer based training system of the invention.

A schematic overview illustrating the overall construction of a computer based training system 1 of the invention is shown in FIG. 1. The system 1 comprises a system controller 2 having a microprocessor circuit of a computer such as a microcomputer operating under control of a system control program. To receive input signals from a user, the system 1 has the following components:

a keyboard 3 and interface 4;

a microphone 5 and voice port 6; and a mouse 7 and mouse port 8.

The system controller 2 is connected to a random access memory (RAM) 9 and operates in conjunction with various storage structures and these include:

an initialisation file 10, graphics bitmap records 15 and graphics animation records 16 within a visual database, a number of interface files 17, a set of data records 18, and a set 19 of simulation and auxiliary training programs.

To output information to the user, the system 1 comprises the following components:

a video output controller 20 and a screen 21, a printer controller 22 and a printer 23, and an audio output controller 24 and a speaker 25.

The system 1 further comprises various hardware components found in conventional microcomputers and workstations.

The input and output components of the system 1 are conventional and indeed the hardware components of the system may be bought in the form of a conventional multimedia hardware system. The invention is provided by the manner in which the system controller 2 operates at a technical level to provide the commercial end-user benefits discussed in the introductory part of this specification. Of particular importance is the manner in which the system controller 2 operates in conjunction with the interface files 17, as these files direct use of the stored data and also help to provide an efficient and flexible production method for the system.

Before describing the manner in which the system controller 2 operates, the following is a brief description of some of the important stored data structures.

The bitmap records 15 are bitmap stills at the required resolution for the video screen 21. The graphics animation records 16 are each a combination of frames to provide an animation visual effect. The records 15 and 16 are all individually addressable and each relate to a single graphic interfacing action. In general, a full pixelmap is stored for a first record, and records for subsequent display only include pixelmaps for the difference between the current display and the previous one.

The data records 18 include both text data and also audio data records. The data is stored in a common, ASCII format with delimiters to separate the records. The data records are individually addressable in this way, and like the graphic records, each relate to a single interfacing action.

The text data records include headers for training Units, each Unit relating to a subject or part of a subject to be learned by the user. The text data records also include header records for Topics, there being a number of Topics within each Unit. Each of the Topic header records includes the location and number of screen flags of the associated interface file. These are described in much more detail below, however, for the present, suffice to say that there is an interface file 17 associated with each Unit. Each interface file 17 includes a number of screen commands, each screen command relating to a screen environment.

The visual database records 15 and 16 and the data records 19 are shown separately because they are used to generate different outputs. However, in operation of the system controller 2, they are processed similarly as they are individually addressable and relate to a single interfacing action of a media type. They may therefore be referred to as individually addressable media records.

Each of the interface files 17 comprises a series of commands which are sequentially interpolated by the system controller 2. In general, there are three broad categories of commands as follows:

(a) Screen commands, the purpose of which is to indicate that a fresh screen environment is to be created.

(b) Interactivity point commands, of which there are generally a number between each successive pair of screen commands. These commands provide for user interactive inputs at interactivity points during the training system operation.

(c) Action commands, of which there are generally a number between each successive pair of interactivity point commands. Each action command is used to direct a particular interfacing action such as display of a box on the screen using data from an associated media record. Implementation of a sequence of action commands between interactivity point commands is referred to as an interfacing event.

The following is an example of part of an interface file.

---
Interface File
---
screen 2 3 14
eff.exe a02__118.gif 93 445 0 1 0 15 15 15
*       You can configure the powerBar or a PainterBar
isave 3 293 201 157 text1
textbox 3 293 201 157
showtext 0 0 7
pause 1 1 1 1 1 1 1 1
**
eff.exe a02__119a.gif 158 428 0 1 0 15 15 15
*       o selecting Toolbars from the Window
isave 3 162 201 72 text2
growbox 3 162 201 72
showtext 0 0 4
pause 1 1 1 1 1 1 1 1
**
eff.exe a02__120a.gif 158 384 0 1 0 15 15 15
*       The menu and the dialog supply the same
isave 3 77 201 4 text3
growbox 3 77 201 4
showtext 0 0 3
pause 1 1 1 1 1 1 1 1
**
image memory text3 0 3 77
image memory text2 0 3 162
image memory text1 0 3 293
eff.exe a02__121a.gif 160 339 0 1 0 15 15 15
eff.exe a02__121d.gif 289 231 0 1 0 15 15 15
*       The configuration options for a toolbar include
isave 7 303 187 184 text1
textbox 7 303 187 184
showtext 0 0 6
pause 1 1 1 1 1 1 1 1
**
eff.exe a02__122b.gif 367 231 0 1 0 15 15 15
eff.exe a02__122c.gif 289 150 0 1 0 15 15 15
*       You change the buttons by selecting the
isave 7 189 187 116 text2

---
-continued

Interface File
---
growbox 7 189 187 116
showtext 0 0 3
pause 1 1 1 1 1 1 1
**
image memory text2 0 7 189
image memory text1 0 7 303
eff.exe a02__123a.gif 94 428 0 1 0 15 15 15
eff.exe a02__123b.gif 192 230 0 1 0 15 15 15
*       You can configure the toolbar buttons so that they
isave 10 292 194 190 text1
textbox 10 292 194 190
showtext 0 0 5
pause 1 1 1 1 1 1 1 1
**
eff.exe a02__124a.gif 94 410 0 1 0 15 15 15
eff.exe a02__124b.gif 192 118 0 1 0 15 15 15
*       If show text is off, . . .
isave 10 195 194 71 text2
growbox 10 195 194 71
showtext 0 0 6
pause 1 1 1 1 1 1 1 1
**
image memory text2 0 10 195
image memory text1 0 10 292
**********
simscrn 2 4 12
******
*
*       You're now going to
isave 197 360 431 275 text1
textbox 197 360 431 275
showtext 0 0 4
pause 1 1 1 1 1 1 1 1
image memory text1 0 197 360
*
qcall ap02q 020104
*       You can add buttons
isave 154 347 462 279 text1
textbox 154 347 462 279
showtext 0 0 3
pause 1 1 1 1 1 1 1 1
*
*       And you can assign
isave 154 284 462 228 text2
growbox 154 284 462 228
showtext 0 0 2
pause 1 1 1 1 1 1 1 1
*

---

It will be seen from this example that there are two types of screen command, namely, Screen +Argument, and Simscrn+Argument. The Argument includes the Unit number, the screen number and the total number of screens within that Unit. The Screen command indicates that a conceptual screen is to be generated and the necessary instructions to do this are contained in the action commands which follow sequentially. These commands are used to generate a conceptual screen including interactive buttons for such functions as Exit, Course, Help, Navigate, Review, Footnote and Continue.

The second type of screen flag, namely, Simscrn+Argument indicates the start of a simulation screen environment. The arguments are the same as for the screen command. The Simscrn command is interpreted by the controller as an instruction to generate an initial simulation screen using a simulation program 18 associated with the particular interface file 17 being used. The simulation screen includes a window which contains the simulation display and control buttons. These buttons differ from the conceptual screen buttons in appearance and are contained in a floating and resizable panel. This sets the background image and includes any menu items, dialogs and controls needed to create a replica of the application being simulated. For example, the training system 1 may be used to simulate another application such as Lotus Notes™.

Regarding interactivity point commands, the most important such command is the Pause command. When this is read, the controller halts the execution path through the action commands and awaits a user input. The most common use for this command is waiting for the user to press a Continue button to move on through the course. In effect, the Pause command defers execution of the action commands until the next event is triggered by a user input. When used in the context of the interface file, the word "event" is intended to mean the set of interfacing actions carried out between interactivity points during the execution path. An important aspect of the pause command is that it allows a user to select Exit Course, Help, Navigate, Footnote, or Review buttons on the screen. These inputs are interpreted by the system controller as an instruction to move to a completely different execution path using a different interface file, or alternatively to use an auxiliary program 19 to temporarily defer further execution through the same interface file.

Another interactivity point command is the command Qcall which directs the controller 2 to automatically retrieve a question according to a question auxiliary program and receive interactive inputs. The first argument of the Qcall command specifies the name of this program file. The second argument is a code which matches with a code in the question file and identifies the section of the file relating to the particular question. Therefore, execution of the action commands is temporarily suspended while the question file program is used whereby the user can provide feedback.

The simulation programs which may be activated at interactivity point commands direct simulation of the training subject's front end interface. This allows the following features and advantages:

a) Recordal of user inputs to provide feedback. This is much more difficult to achieve using a live training subject application with a training shell.

b) There is a limited range of allowed user inputs and freedom generally in order to sharply focus the training procedure.

c) There is complete compatibility of software running at all times.

d) The simulation programs not only direct simulation of the training subject interfacing aspects, but also provide working examples and thereby improving training effectiveness.

In a simulation environment, the interactivity point command Task results in retrieval of a simulation program 19. As described in more detail below, a simulation program comprises code or script in a discrete format, a discrete piece of code or script being associated directly with a screen pixel display area. The simulation program causes a dialog to be displayed on the video screen. This dialog contains a statement indicating what is to be done in the task and allows the user select a button to cause display of an exercise dialog and a button to cause display of a dialog containing a list of the steps required to complete the task successfully. Once the task dialog has been displayed, the controller 2 continues on the execution path with the next command. The next command is usually the Step command, which is also an interactivity point command. There is a step command for each step in the task and each Step command causes the controller to suspend execution of the action commands and execute a simulation program 19. The simulation program 19 contains all of the information needed to execute it and judge the step. The controller 2 enters an idle loop while waiting for the user to attempt the step. While in this loop, the controller 2 can process input signals given by the user. If the user completes the step successfully, a flag is set to indicate that the step is finished and the controller 2 reverts back to the execution path. If the user's attempt at the step was incorrect, a dialog is displayed which contains some feedback and allows the user the option to try the step again or to be shown the correct method. Again, simulation programs may be needed to do this. The Exercise interactivity point command is similar in nature as it suspends the execution path and causes the controller 2 to retrieve a simulation program 19. This program directs display of an exercise statement and a list of the tasks comprising the exercise. A scrolling list box is employed to display the task list and this automatically disables the scrolling function if the entire list of tasks can be displayed at once.

The following are examples of action commands.

Backdrop

This is used to set the default backdrop image for simulation screens. It is stored as a DIB, and the filename, position and dimensions are specified. These arguments are parsed and stored in a user defined variable which has fields for the name, top and left positions, and the width and height.

Eff. exe

This causes a graphic to be plotted on the screen, optionally including wipe effects. The graphic can be in BMP, DIB or GIF format. The graphic is initially read into a temporary off-screen buffer of the controller 20 and is then transferred onto the main visible picture area using either a bitblt API function or a custom control. Also, if the graphic is in GIF format, it must be converted to bitmap format. This is done with conversion code or a custom control.

Textbox

This causes the controller 2 to draw a text box on the screen. The arguments for the textbox indicate the position of the text box; the x coordinates are from the left side of the screen to the right, while the y coordinates are from the bottom to the top. The command arguments are parsed and read into a user defined variable structure. This variable contains such information as the position of the text box, the text it contains, the number of lines of text in it and whether or not it is loaded. This structure is also used for growboxes and noteboxes and so can contain data relevant to these items. The text for the textbox is read form a text data record 18 which only contains text for textboxes, growboxes and noteboxes. Before being printed to the on-screen text box, the text is automatically wrapped in a multiline text edit control. This control will have been previously set to the width of the textbox. The text can then be printed line by line into the on-screen textbox. It is possible to underline sections of the text, or to print it in red or blue. The method for doing this is the same as for the growbox. Sometimes a footnote is included with the text for a textbox. This is indicated by formatting characters in the text file. If a footnote is available, a small icon is included beside the text in the growbox and the footnote button on the screen is enabled.

Growbox

This causes the controller 2 to draw an extended textbox. The Growbox command is always preceded by a Textbox command, usually a few lines earlier. Therefore a textbox will already be visible on the screen. The arguments for the growbox will be the same in the x-direction as for the related textbox, and the arguments for the y-direction will be for an area below and slightly overlapping it. This is the position for the extension to the textbox.

The command arguments are parsed and read into a user defined variable structure, which is of the same type as the one used for the original textbox. One of the fields in this structure defines it as relating to a growbox. Also contained in the textbox structure is the text relating to the growbox. This is read from text data record 18 which only contains text for textboxes, growboxes and noteboxes. Before being printed to the on-screen text box, the text is put into a multiline text edit control. This control will have been previously set to the width of the growbox, and it automatically wraps the text to fit. The text can then be printed line by line into the on-screen growbox.

It is possible to underline sections of the text, or to print it in red or blue. To do this, formatting characters are included in the text. Before printing the text, these formatting characters are parsed and their position and meaning are stored in an array. If a line to be printed contains, for example, a word in red text, the line is broken up and printed piece by piece. First the text up to the coloured word is printed without a carriage return at the end. Then the fore colour of the text box is changed to red and the coloured word is printed (it will appear in red). Finally, the fore colour is changed back to the original and the rest of the line is printed with a carriage return at the end. If there is more than one formatted section in a line, then the line is broken up into more parts and the same procedure is followed.

Sometimes a footnote is included with the text for a growbox. This is indicated by formatting characters in the text file. If a footnote is available, a small icon is included beside the text in the growbox and the footnote button on the screen is enabled.

Notebox

The Notebox command causes a dialog to be displayed on the screen with some text and an OK button in it. The Notebox has much in common with the Textbox and Growbox commands and uses the same data structure type in the code. One of the fields in the textbox data structure serves as a flag to indicate whether it represents a notebox or not.

The notebox is also capable of displaying sections of its text as underlined text or displaying it in red or blue. The mechanism for doing this is the same as described in the growbox section above.

Wrapping the text to fit neatly in the notebox is done the same way as for the growbox, employing a hidden text edit control to contain the text and reading it out line by line. However, different actual text edit controls are used for the notebox and textbox/growboxes. This is because it is possible that a notebox and a textbox can appear on the screen simultaneously, so both texts may need to be contained in text edit controls at the same time.

The notebox dialog is shown modally on the screen, so the user must clear it by pressing the OK button to proceed with the course.

Image Memory

This is used to clear textboxes and growboxes from the screen. First the control containing the text is made invisible, then the text is removed from the text edit control used for wrapping the text. Finally, a flag in each data structure relating to the textbox/growboxes is set to indicate that they have been unloaded.

Isave

The arguments included with the Isave command describe an area on screen and a name. Only the name is used to keep track of the textboxes and growboxes on the screen. This is stored as a field in the textbox data structure.

Rcall

The Rcall command provides the ability to call an auxiliary program 19 specifically written to implement some functionality not normally catered for in the interface file commands. The argument is a unique code which identifies the auxiliary program to be executed. The code language consists of a rich library of instructions which provide the ability to manipulate the screen, externally from the system control program itself. It is most commonly used in simulation and wide conceptual screens. Examples of its use are manipulation of menus, dialogs, toolbars and controls used to simulate a third party's application which is the subject of the training course. In some cases, where the auxiliary program is not sufficient in detail to perform a required action, the routine may be hardcoded into the system control program The Rcall action command is therefore different from the other action commands in that it uses an auxiliary program 19, although it is not an interactivity point command.

Figure 2:
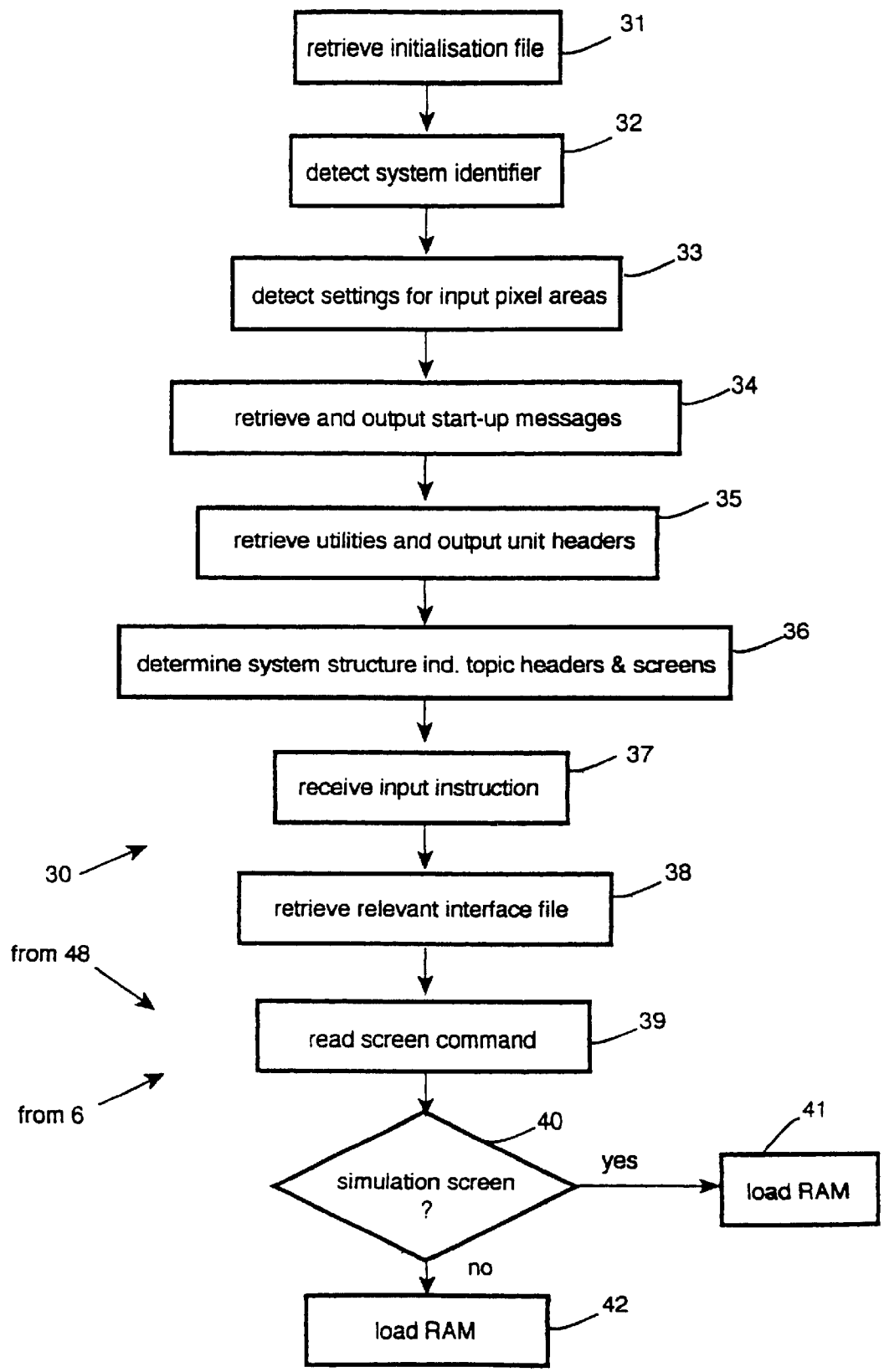
FIG. 2 is a flowchart illustrating initial operations which are carried out by a system controller.

Referring now to FIG. 2, operation of the system controller 2 in the initial stages is now described. In step 31, the controller 2 retrieves the initialisation file 10 and in step 32, it detects a system identifier. The reason for this is because the system controller operates according to a system control program which is generic to a number of different computer based training systems, the identifier from the initialisation file providing the specific tags which are required. In step 33, the controller 2 detects from the initialisation file 10 settings for input pixel areas, namely the input buttons which are required for general operation of the system. In step 34, the controller 2 retrieves from the initialisation file 10 output start-up messages for the user and these are displayed on the screen 21. In step 35, utility programs are retrieved and the controller 2 reads through an indicated set of text data records 18 to identify unit header records. The controller 2 in step 36 then determines the educational structure within each Unit by retrieving Topic headers and data relating to screens used in the Topics. This data includes the location of screen commands within the interface file associated with the Topic. In steps 35 and 36, the controller 2 directs display of lists of the available Units and Topics in a hierarchial menu arrangement. Input instructions are received in step 37 indicating the required Unit and Topic and in step 38, the controller 2 retrieves the interface file 17 which is associated withe the particular Unit. In step 39, the controller 2 reads the relevant screen command which has been identified by the relevant Topic header and determines in step 40 if it is a simulation screen flag or a conceptual screen flag. In either event, all of the interface file commands between that screen flag and the next screen flag are written to the RAM 9, as indicated by the steps 41 and 42.

Figure 3:
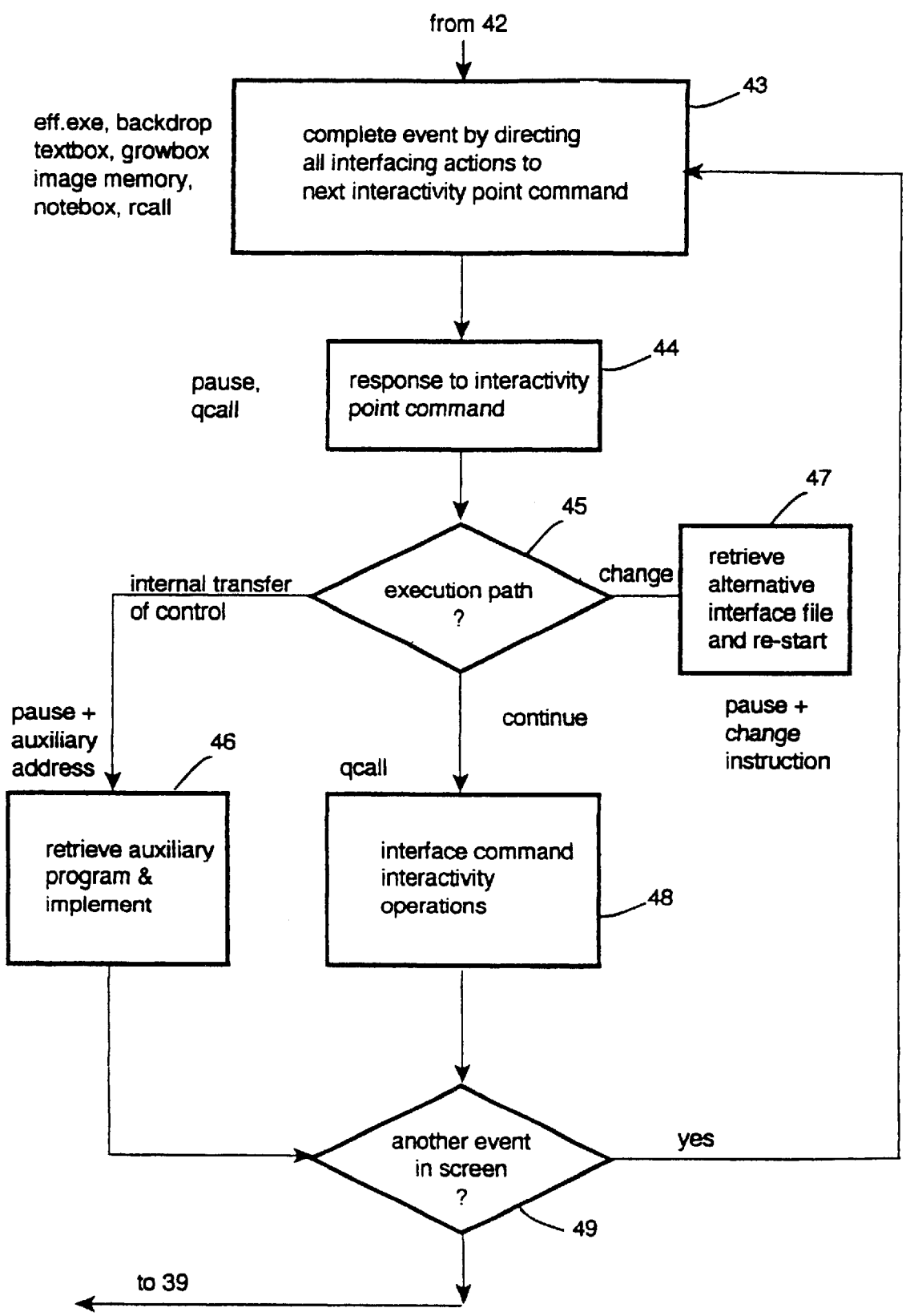
FIG. 3 is a flowchart illustrating operation of the system controller for a conceptual screen environment.

If the first screen flag is a conceptual screen flag, the steps illustrated in FIG. 3 are then implemented by the controller 2. In step 43, the controller automatically performs all of the actions between the screen command and the first interactivity point command. This set of actions which are performed automatically in sequence are referred to as an interfacing event. In this case, the event is the generation of an initial conceptual screen. Possible action commands are indicated next to the step 43 in FIG. 3.

At step 44, an interactivity point command is reached and where the screen flag is a conceptual screen flag, this may be the command Pause or the command Qcall. In step 45, the controller 2 determines how to proceed with program execution. This depends on the nature of the interactivity point command and the nature of the input which is received from the user. The execution path may be suspended and this is referred to as an internal transfer of control in FIG. 3. When this happens, step 46 is carried out wherein the controller 2 retrieves an auxiliary program and implements it. The auxiliary program may be a program related to the Review button which allows the user to review all of the steps which have taken place up to that point in execution as they are logged as they take place. This will happen in response to a Pause interactivity point command followed by input of the address for the auxiliary program (for example, by pressing the Review button on the screen). Immediately, when the auxiliary program has been executed, control returns back to the next action command in the interface file 17 and the next event is implemented by sequential implementation of the action commands for the event.

The input which is received from the user may indicate that the execution path is to be halted permanently, in which case the controller 2 retrieves an alternative interface file and re-starts processing according to the desired screen command in that file. This is much like starting afresh at another Unit and Topic.

Alternatively, the controller 2 may automatically continue on the same execution path by implementing a program such as that identified by the Qcall command before continuing with the next action command. There is no user choice of whether or not to use this program as it is retrieved and implemented automatically. The interactive inputs are required during use of the program such as to answer questions, however, they do not initiate retrieval of the program. As indicated by the decision step 49, the controller 2 returns to step 39 if there are no further events in the screen, and returns to step 43 if there is another event.

Figure 4:
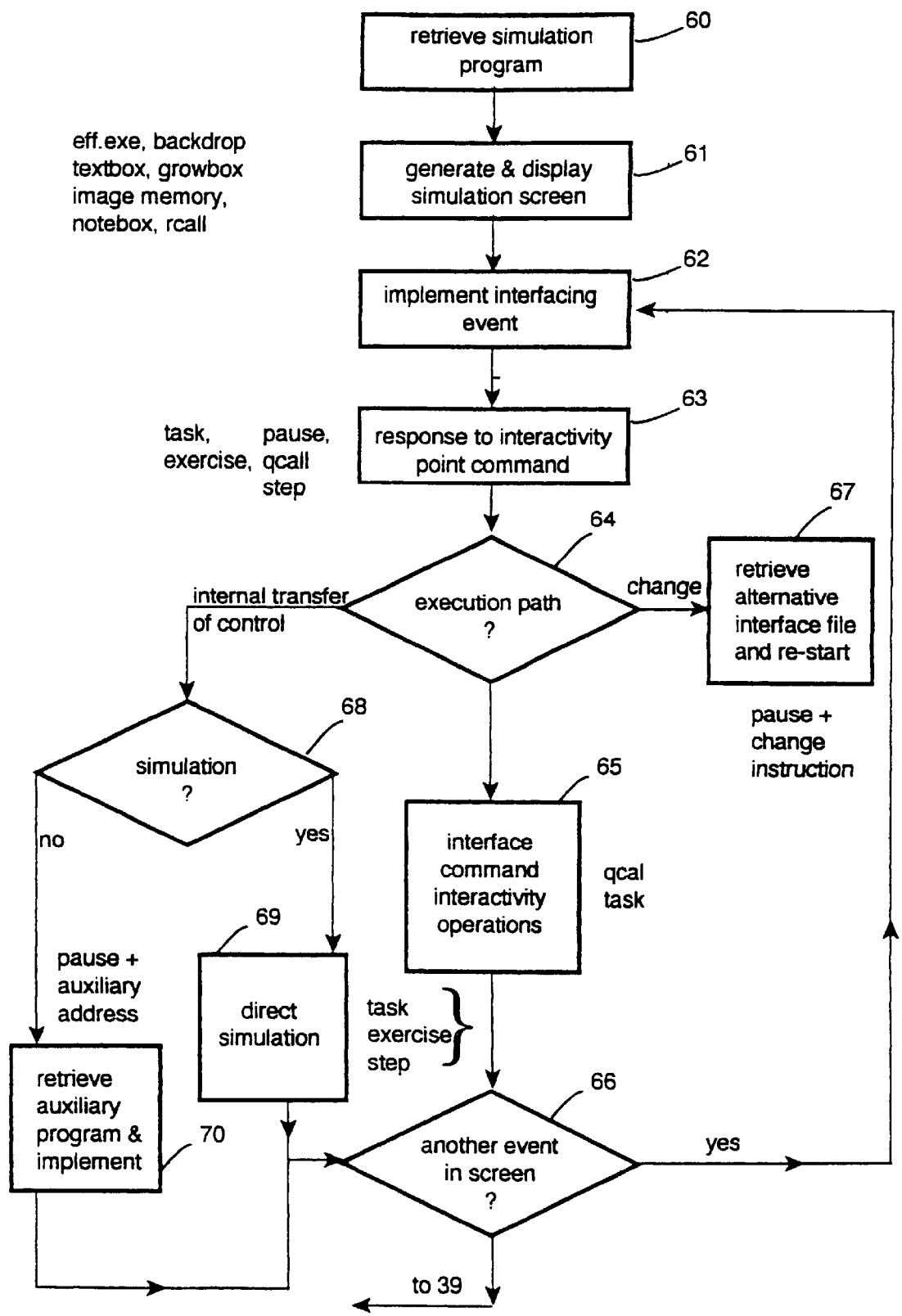
FIG. 4 is a flowchart illustrating operation of the system controller for a simulation screen environment.

Referring now to FIG. 4, the operation of the controller 2 in response to detection of a simulation screen command is described. In step 60, the controller 2 retrieves a simulation program associated with the interface file and uses it to generate an initial screen in step 61.

In step 62, the controller 2 implements an interfacing event, as described above using a sequence of action commands before the next interactivity point command. In step 63, a response is received after an interactivity point command is implemented and a decision is made as to further execution in step 64. As described above, the execution path may be changed completely if the user requests a different Unit and Topic as indicated by step 67. Again, execution may continue on the path using either the Qcall or the Task interactivity point commands. Alternatively, there may be an internal transfer of control, the nature of which is decided in the decision step 68. If simulation is required in step 69, the controller 2 retrieves one of the simulation programs 9 and directs a simulation operation such as task, exercise or step operations, as described above.

An important aspect of the simulation operations are that each of the simulation programs has a discrete structure with a discrete piece of code or script providing a simulation handler associated with each input button or pixel area of a screen, also referred to as a screen control. They also include additional code for such operations as evaluating how a user performed at a task. The following is an example of a simulation program.

| Simulation Program Example |
|---|
| EVENT button_1 CLICK |
|   DIALOG FILE_OPEN |
| END EVENT |
| EVENT button_2 CLICK   &&   textbox_1="file1.cbt" |
|   CLOSE FILE_OPEN DIALOG |
| END EVENT |
| EVENT button_3 CLICK |

| -continued |
|---|
| Simulation Program Example |
|   CLOSE FILE_OPEN DIALOG |
| END EVENT |
| EVENT button_1 CLICK   &&   textbox_1!="file1.cbt" |
|   MSGBOX "File does not exist !" |
|   CLEARTEXT textbox_1 |
| END EVENT |
| EVENT textbox_1 ENTER   &&   textbox_1="file1.cbt" |
|   CLOSE FILE_OPEN DIALOG |
| END EVENT |
| EVENT textbox_1 ENTER   &&   textbox_1 !="file1.cbt" |
|   MSGBOX "File does not exist !" |
|   CLEARTEXT textbox_1 |
| END EVENT |
| END TASKEVENTS 01 |
| TASK 01 |
| JUDGE CORRECT |
|   BUTTON_1 CLICKED |
|     BUTTON_2 CLICK   &&   TEXTBOX_1="file1.cbt" |
|     TEXTBOX_1 ENTER   &&   TEXTBOX_1="file1.cbt" |
| JUDGE INCORRECT |
|   BUTTON_3 CLICK |
|   BUTTON_1 CLICK   &&   TEXTBOX_1!="file1.cbt" |
|   TEXTBOX_1 ENTER   &&   TEXTBOX_1!="file1.cbt" |
| END JUDGEMENT |

In the example above, a dedicated scripting language is used in which the word EVENT indicates the start of a discrete simulation handler and the words END EVENT indicate the end. Each of these units is performed in response to an input at a pixel area (referred to also as a screen control) on a screen such as button_1 CLICK. At the end of the above example, there are instructions to verify if the task has been performed correctly. It is an important aspect of the simulation programs whereby instructions for input/output are in discrete simulation handlers, each associated with a pixel area or screen control during simulation. This allows for a wide degree of flexibility in design and performance of a computer based training system, particularly in conjunction with the manner by which they are retrieved and implemented.

In more detail, each discrete piece of code may be referred to as a simulation handler. Some handlers include conditions at the start of the execution of the script code for a particular input at a screen control or input area is dependent on the state of another control on the screen. During simulation, the simulation program links simulation handlers with input areas or controls of the screen. Therefore, user interaction with a control may change during simulation. Further, it is possible to use the same control for different purposes at different times. For example, if two dialogs were used at different times in a task, the same control might be used for the "OK" button on each. This avoids the need to store two sets of control data in memory, while presenting only one on the screen for the user. Instead of having two controls, two simulation handlers are linked for the control and then swapped as required. At the end of operation of a simulation program, all simulation handlers are detached from the controls. This has the important advantage that between simulation sessions, the user is unable to change the state of the interface.

If simulation is not to be performed at this particular interactivity point command, the controller 2 retrieves an auxiliary program such as a Help program and performs the necessary operations before returning control back to the execution path as indicated by the step 66. Again, a further sequence of action commands may be implemented by return to the step 62, or alternatively, a next screen command may be read by returning to the step 39.

Figure 5:
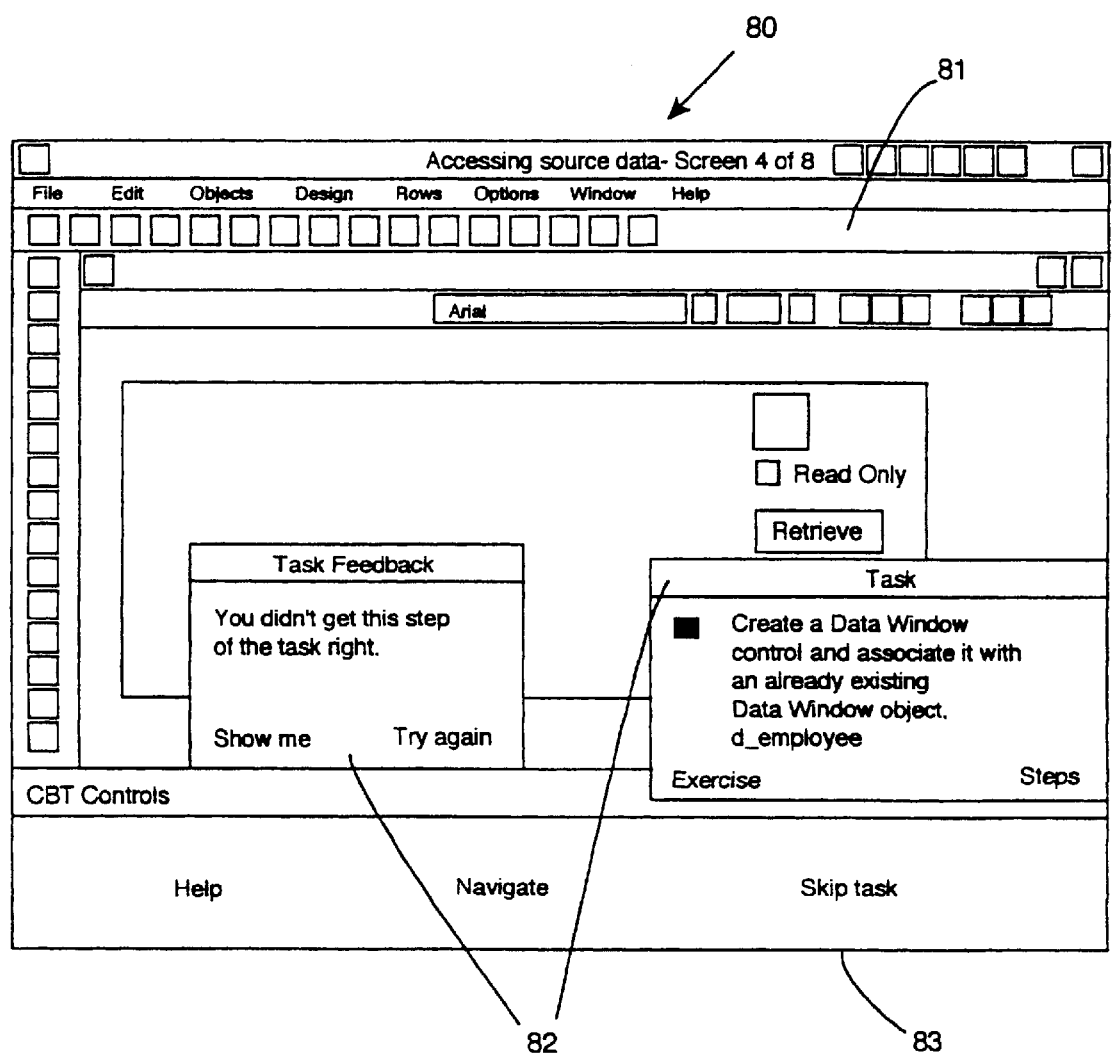
FIG. 5 is a sample screen display during simulation.

To help understand operation of the system 1 when the controller 2 is operating according to a simulation program, FIG. 5 shows a sample simulation screen 81 in which there are superimposed windows 82 for performance of simulation operations. The general screen 81 is generated immediately after a simulation screen command is read and the windows 82 are generated in response to a simulation program at a Task interactivity point command. The pixel area 82 is part of a conceptual screen.

To produce the training system 1, initially a master media data document 102 hereinafter referred to as a master document is produced. A master document is a document produced by an author of the text information which is to be communicated by the system. This document is generated using a standard word processor and therefore is easy to produce by the author. The master document comprises various headers such as "Unit" and "Topic" headers, there being a number of Topics in each Unit. In this embodiment, the master document contains only text data, however, it could include graphics or visual data generally, or audio control data.

Figure 6:
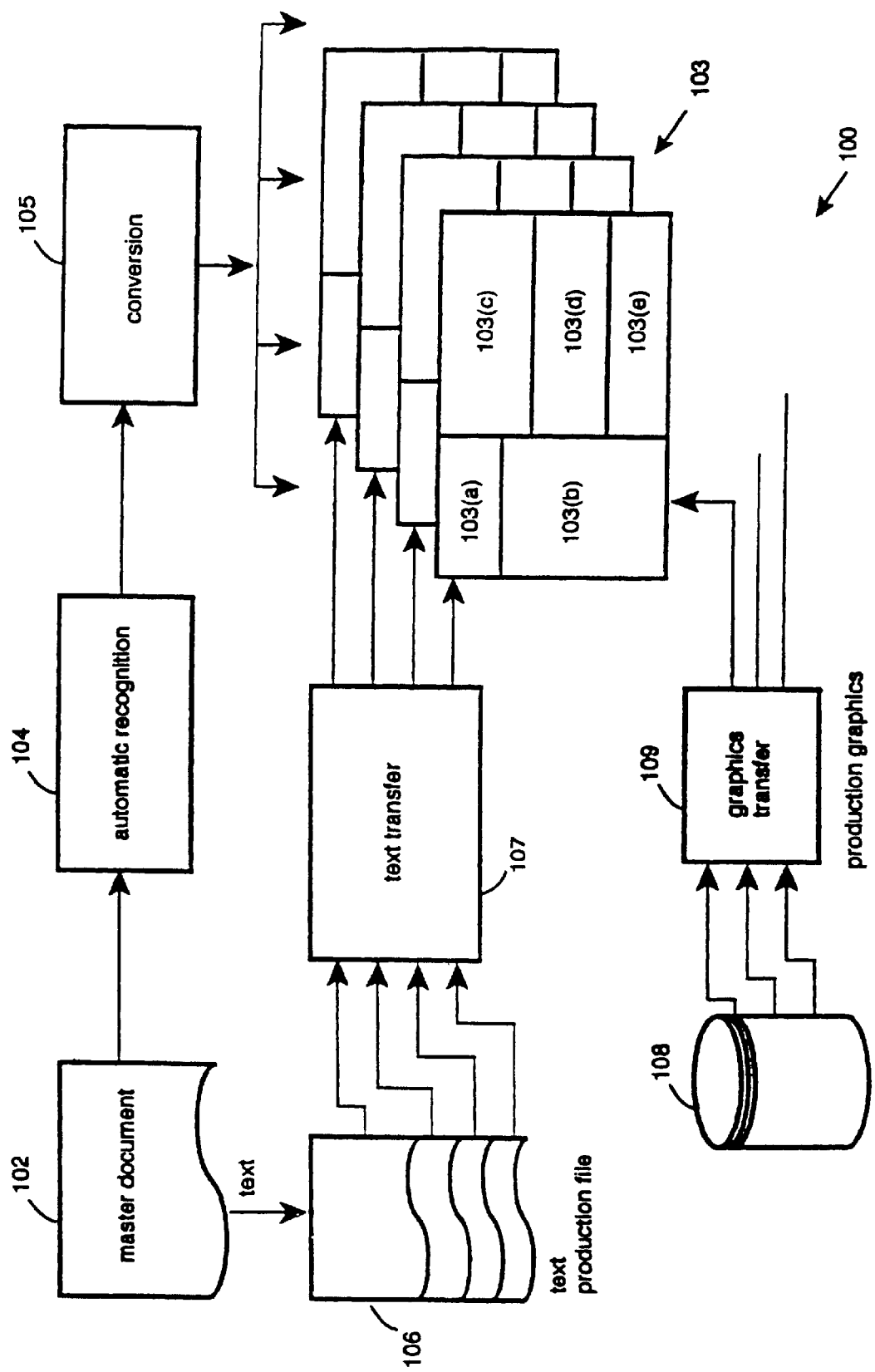
FIG. 6 is a diagrammatic representation of a method for producing a computer based training system.
Figure 9:
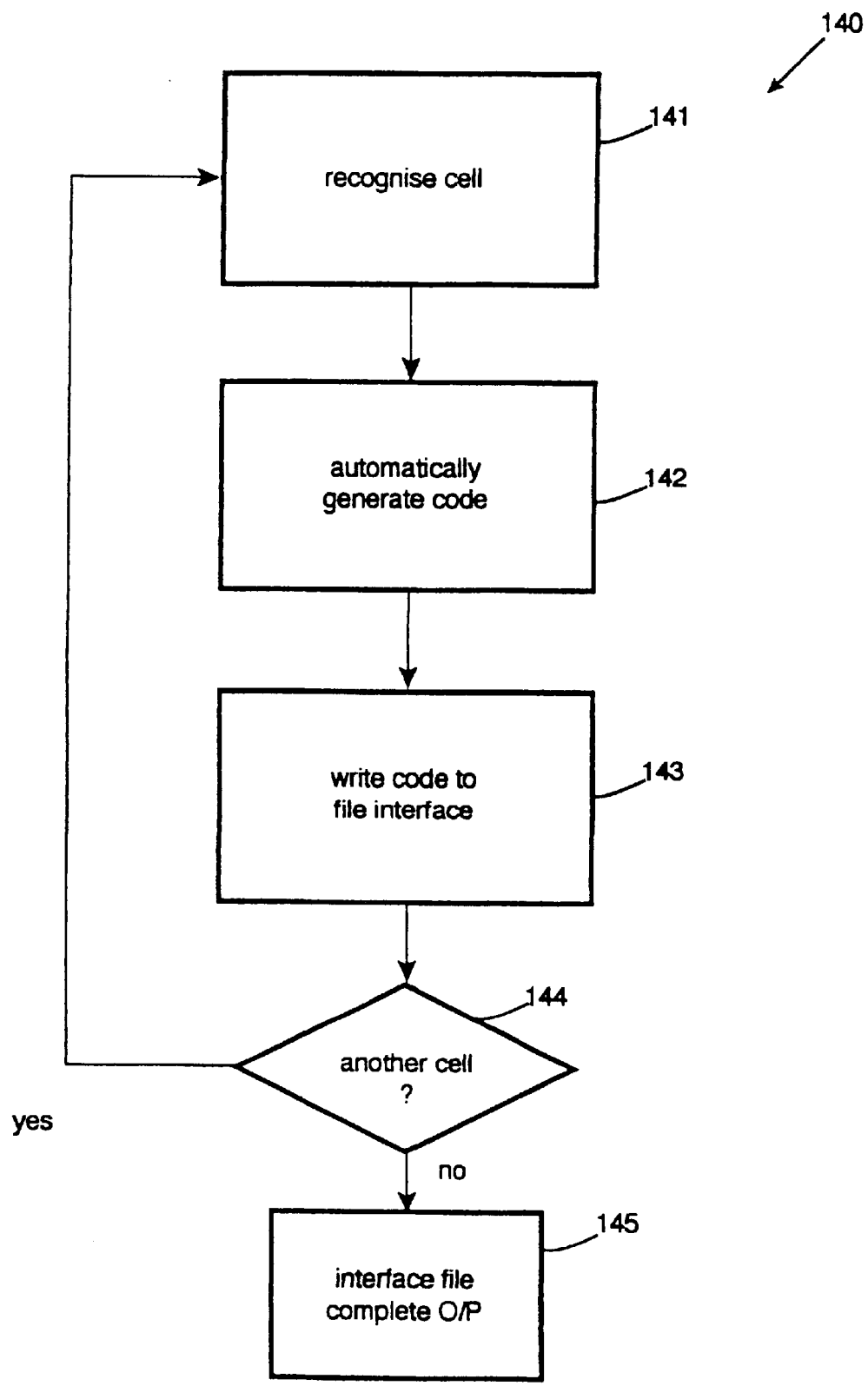
FIG. 9 is a flowchart illustrating the manner in which an interface file is generated.

A storyboard 103 is also generated. A storyboard in this specification means a memory structure which has individually addressable cells, there being a group of cells associated with one interfacing action during operation of the system which is produced. Each of these cells is individually addressable. As shown in FIG. 6, there are five cells for each group. Each cell relates to an interfacing action, and each group to an event. The groups are based around screen displays, however individual cells may relate to interfacing actions for different media such as audio.

The method involves the production controller reading the master document 102 and automatically recognising the various flags. The flags need not necessarily be deliberately inserted into the master document for the production method as they could be conventional flags used for other purposes in a word processor document. The automatic recognition step 104 involves recognition of many different flags such as screen breaks, headers, footers and topic flags. In step 105 the information associated with the flags is used to pre-assign the function of each cell in each group of the storyboard 103. Each screen break flag (to initiate a new screen display) causes the production controller to automatically refer to the next group of cells in the storyboard 103. The conversion step 105 involves conversion to the relevant file format and allows compatibility with different master document program formats.

A text file 106 is then generated by the production controller automatically stripping text from the master document and writing it in individual paragraphs without any flags. Subsequently, the production controller processes the text file 106 and transfers text in blocks of a single paragraph to the first cell 103(a) in each group of the storyboard 103 as indicated in FIG. 6. This is a direct transfer of "flat" text in a common format. The result of this step is an interim storyboard representation shown in FIG. 7 and indicated by the numeral 125. It can be seen that the first paragraph of the text file 106 has been transferred to the first cell under the heading "Written Text". These text transfer operations are repeated for the sixth cell of each group having the heading "Comments". The "graphic" section is blank at this stage.

The next step of the method is carried out by the production controller with reference to a graphics database 108. This step involves transfer of retrieved or newly-created graphics in step 109 to the relevant (second) cell within each screen display group of the storyboard 103. The result is the screen display 130 shown in FIG. 8 in which there is a basic graphic which has been directly retrieved from the database 108. It will be appreciated that because this graphic has been retrieved directly from a database under operator instructions, very little data processing is involved however, graphics may also be generated where existing graphics are not sufficiently illustrative of text in the cell group.

The next steps of the method are extremely important as they involve generation of the interface file. This is not only part of the produced system but is also used for verification and modification of the system during production. These steps are indicated generally by the numeral 140 and in step 141 the production controller automatically recognises each cell in turn of the storyboard 103. As stated above, there are five cells within each group, each group corresponding to a single screen display and an interfacing event. This in turn corresponds to a single key depression of the user at an interactivity point in operation of the system when produced.

On recognition of each cell in turn, an action command is automatically generated where appropriate in step 142 to direct output of the contents of that cell using an individually addressable media record. Some cells do not have any code generated as they may be left blank, for example a comment cell. In step 143, the code is written to the interface file. As indicated by the decision step 144, steps 141 to 143 are repeated for each cell and finally in step 145 a signal is outputted to indicate that all cells have been automatically processed. Screen commands and interactivity point commands are generated either manually or automatically according to flags of the master document.

Figure 10:
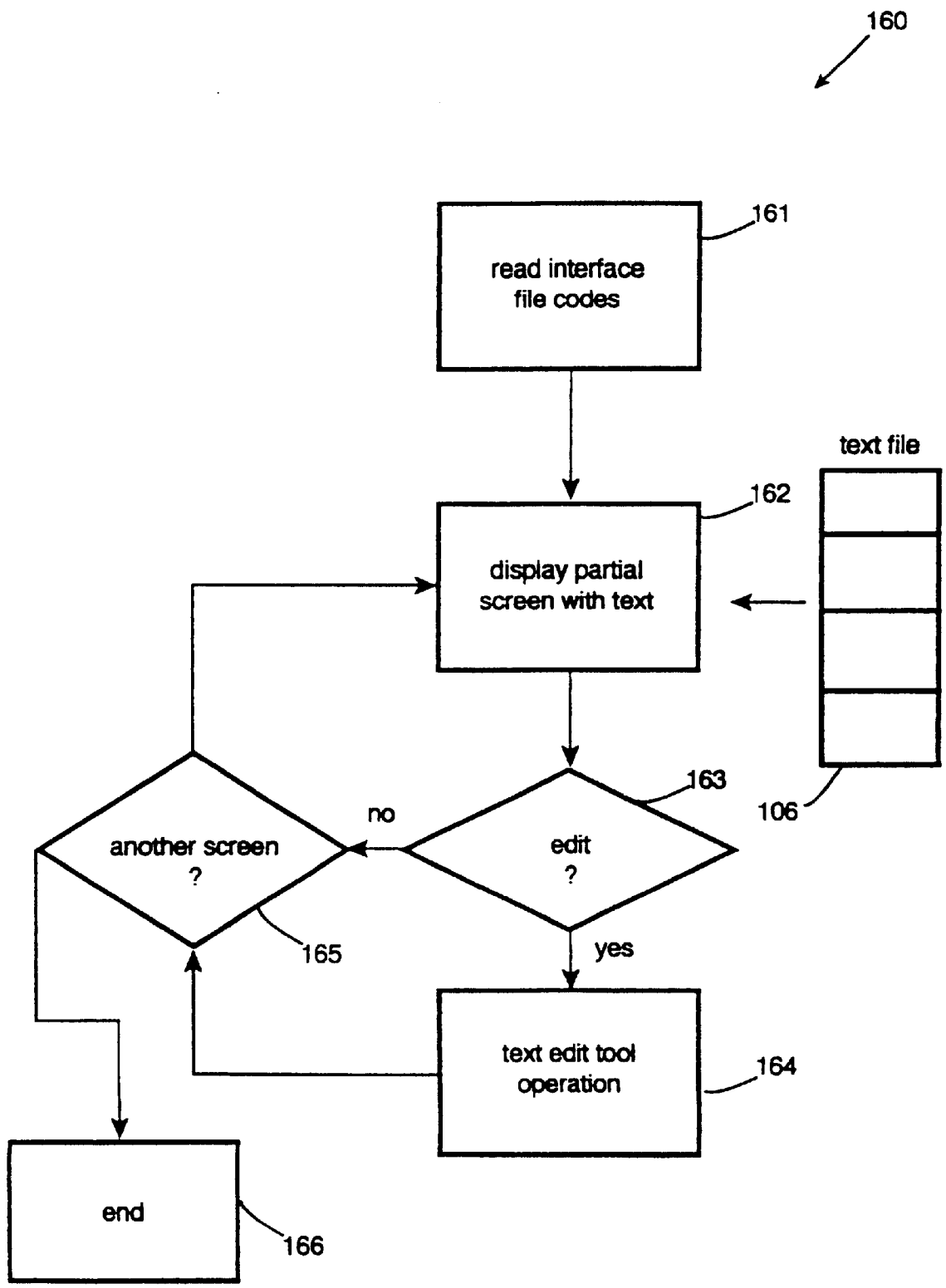
FIGS. 10 and 11 are flowcharts illustrating modification of the system being produced.

Referring now to FIG. 10, the steps of the method which involve modifying or editing text are illustrated. These steps are indicated generally by the numeral 160. In step 161 the production system reads interface file commands in turn and in step 162 displays a screen with text retrieved from the text file 106. The text is displayed in a frame or box. Various tools may be used as decided by the decision step 163 to edit the text in step 164. Such tools may allow resizing or repositioning of the text. The text box is automatically displayed with a default size selected according to the items to be displayed on the same screen and to the result of any word-wrapping carried out. These steps are repeated for each screen display. An important aspect of the method 60 is that it is carried out on a step-by-step basis. There is one screen display for each step. This is facilitated by the structure of the storyboard, and therefore of the interface file.

Figure 11:
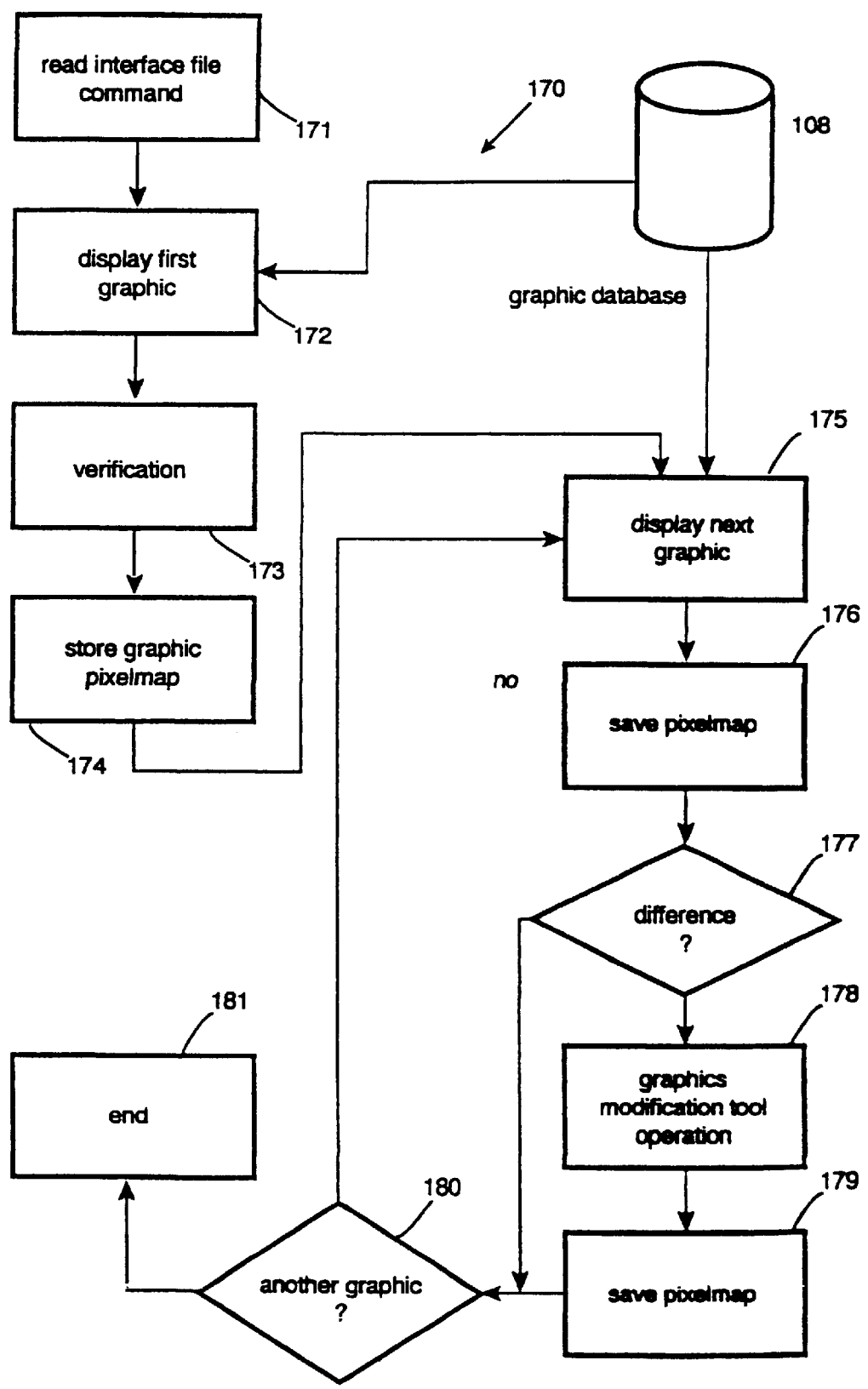

Referring now to FIG. 11, the manner in which the graphics are modified and stored for eventual use in the target computer is illustrated. These steps are indicated generally by the numeral 170. In summary, graphic modification involves initial verification of the first graphic and automatic steps to reduce storage space required for subsequent graphics. There is also verification of each subsequent graphic. In step 171 the interface file commands are read in turn and in step 172 a partial screen with the graphic pixelmap for the first cell group is retrieved from the graphics database and is displayed. There is then operator interaction for verification of the displayed graphic in step 173. This is verified (with or without editing) and a pixelmap of this (first) graphic is generated, and stored on the graphics database 108 in step 174.

When the production system proceeds to the next interface file command, it displays the graphic of the next screen display in step 175. This step involves visual verification of the graphic. In step 176, the production system automatically compares the pixelmap for this graphic with the first one.

As indicated by the decision step 177, the pixelmap to be stored may be modified according to the comparison by a modification tool in step 178. The system automatically draws a frame around pixels included in this pixelmap but not in the first pixelmap. This frame is preferably regular in shape. The difference pixelmap determined in step 178 is then stored together with the video controller scaling control signals in the interface file command in step 179. Of course, this step also involves modification of the relevant interface file command as appropriate. As indicated by the decision step 180, steps 175 to 179 are repeated for each subsequent screen display, subject to the decision step 177. In each pass, the comparison step 176 is carried out with reference to the previous graphic. In some instances the graphic will not change from one screen display to the next and there will be no need to store any pixelmap—a simple modification to the interface file command sufficing.

The training system which is produced comprises the interface file, the text file, the graphics database, a system control program, auxiliary programs, and simulation programs. These may then be loaded and run on a target computer, preferably of the multi-media type. The system control program is written to direct system operation with reference to the interface file and other programs as described with reference to FIGS. 1 to 5. The graphics database may be more generally referred to as a visual database, as it may include video control records for video playback. The text file may be more generally referred to as a set of data records, each record relating to text data or to an audio data. More generally, all of these records may be referred to as media records, each being individually addressable and associated with an interface file command. Further, the master document may contain all of the media data, including text, graphics, video and audio data, in which case a graphics database would not be required.

It will be appreciated that by editing the graphics in this manner there is not only effective modification and verification by use of the interface file, but also the provision of commands which allow extremely efficient operation of the end product computer based training system. The interface file provides for production emulation to enable verification and then forms a central part of the produced system. In general, the interface file command forms a core part of both the production method and the system and provides similar underlying technical features.

The video RAM of the target computer need not be completely refreshed between screen displays. This is particulary important for training systems where there are a large number of screen displays, each one generated by user depression of an individual key on the keyboard.

It will therefore be appreciated that the production method provides for highly automated production of a training system, however, there is still a large degree of flexibility. This arises primarily by use of the interface file whereby individual cells can be addressed for modification as required while at the same time the cellular structure provides for automatic verification and final production where this is required.

What is claimed is:

1. A computer based training system comprising a user input means, a system controller, a storage means for storing training data, and a user output means including a video screen, wherein, said storage means stores independently addressable media records having media interface data;

said storage means stores an interface file comprising a series of interface action commands for performance of a training unit associated with a subject or part of a subject to be learned by a user, each action command being associated with a media record and comprising code for instructing an interfacing action to be performed using media interface data retrieved from the media record;

said system controller comprises means for:

identifying in the interface file a sequence of action commands which are associated with an interfacing event, said interfacing event being an event which the system performs, automatically, without user inputs, between interactivity points at which a user may input a signal;

automatically performing, without user inputs, interfacing actions according to said sequence of action commands to perform an interfacing event in which a media record is individually addressed and retrieved in accordance with each action command; and receiving a user input signal at an interactivity point reached only upon completion of the interfacing event, acting in response to the received input signal by retrieving a simulation program and carrying out simulation operations according to the simulation program, and subsequently identifying in the interface file, by the system and without user input, a next sequence of action commands for a next interfacing event and performing said next interfacing event without user input to continue an execution path determined and controlled by the system, sequentially using action commands contained in the interface file.

2. A system as claimed in claim 1, wherein the interface file further comprises interactivity point commands which delimit sequences of action commands for events, and the system controller comprises means for recognising said interactivity point commands and directing interactivity inputs according to said commands.

3. A system as claimed in claim 1, wherein the simulation programs have a discrete structure with a discrete simulation handler piece of code associated with a screen input control during simulation.

4. A system as claimed in claimed in claim 1, wherein the system controller comprises means for directing transfer of control to an execution path of an alternative control file at an interactivity point upon receipt of a user input instruction.

5. A system as claimed in claim 1, wherein the interface file comprises screen commands delimiting commands for a plurality of events, and the system controller comprises means for directing generation of a new video screen environment upon detection of a screen command.

6. A system as claimed in claim 5, wherein there are two categories of screen command, namely, a conceptual screen command and a simulation screen command, and the system controller comprises means for:

directing generation of a fresh interfacing screen environment for display of training data upon detection of a conceptual screen command; and directing generation of a simulation screen environment having screen input areas simulating those of the training subject upon detection of a simulation screen command.

7. A system as claimed in claim 1, wherein the media records comprise text data records and audio records, the records being individually addressable by being delimited in a common format and further comprise graphic bitmap and graphic animation records.

8. A system as claimed in claim 1, wherein the media records video control records.

9. A system as claimed in claim 1 wherein the system controller comprises means for dynamically linking simulation handlers with screen controls during simulation, and for disconnecting all simulation handlers at the end of use of a simulation program.

10. The system as claimed in claim 1, wherein the computerized training system drives the interfacing events to present to a user at least one training unit associated with a subject to be learned by the user, the subject of said training unit being other than instruction on use of said computerized training system.

11. The system as claimed in claim 10, wherein the computerized training system drives the interfacing events to present to a user a plurality of training units associated with a plurality of subjects to be learned by the user, all of said subjects being other than instruction on use of said computerized training system.

12. The system as claimed in claim 1, wherein said system controller alone determines retrieval of said media records during implementation of said interfacing events, with action commands being linked to discrete media records transparently to, and independently of action by, the user.

13. The system as claimed in claim 12, wherein user input is strictly limited to interactivity points reached upon conclusion of an interfacing event and, following user input and associated simulation operations, said system initiates return back to a next internally-determined sequence of action commands associated with a next interfacing event.

14. A method of producing data and programs for loading in a target computer to provide a computer based training system, the method comprising the steps of:

preparing, by an author, a master media data document having media data and flags, said document containing training media and being prepared independently of the target computer;

storing the master media document;

generating a memory storyboard having a cellular structure in which there are groups of cells, each group being associated with an interfacing event of the target computer, an interfacing event being a set of interfacing actions between user interactivity points of the target computer, each of the cells within a group being individually addressable, and in which the interfacing actions are not time synchronized and are of different time durations;

a production controller reading the master media data document, recognizing flags within the document, and pre-assigning each cell to an interfacing action according to the flags without input from the author, the production controller automatically transferring media data from the master media data document to relevant pre-assigned cells within the storyboard;

processing, automatically by the production controller, each cell of the storyboard in turn to generate an interface file having action commands associated with cells of the storyboard, each action command comprising code for directing an interfacing action of a training system with respect to an associated cell, wherein the action commands are grouped in sequence to cause performance of an interfacing event delimited by interactivity points;

generating a set of media records storing media data also stored in cells of the storyboard; and combining said media records and said interface file together with a training system control program.

15. A method as claimed in claim 14, comprising the further steps of:

displaying and verifying a graphic stored in a media record;

comparing a pixelmap of the graphic with that of the next graphic pixelmap in operational display order; and automatically determining pixelmap differences and generating a frame around the difference pixels;

storing the pixelmap differences in a media record; and modifying the associated interface file command accordingly.

16. A method as claimed in claim 14 comprising the further step of emulating training system operation by use of the interface file, editing cells within each storyboard group, and editing the associated interface commands accordingly.

17. A method as claimed in claim 14 comprising tie further steps of stripping text data from the master media data document, transferring it to a text file, transferring text data to the storyboard cells from said text file, and storing the text file to provide media records for text data.

18. A system-driven, computer based training method using a computerized training system in which overall execution is driven by an interface file, said computerized training system being used to perform at least one training unit associated with a subject to be learned by a user according to a system-determined presentation, the subject of said training unit being other than instruction on use of said computerized training system, the method comprising the steps of:

storing independently addressable media records having media interface data;

storing an interface file including a series of interface action commands for performance of a training unit associated with a subject or part of a subject to be learned by a user, each action command being associated with a media record and comprising code for instructing an interfacing action to be performed using media interface data retrieved from the media record;

identifying a sequence of action commands which taken together constitute an interfacing event, an interfacing event being an event defined by a sequence of action commands which the system performs automatically and without user inputs between interactivity points, interactivity points being those points at which a user may input a signal;

automatically performing, without user input, interfacing actions according to said sequence of action commands to perform the interfacing event;

allowing input of a user input signal only at an interactivity point, said interactivity point being reached only after completing the interfacing event such that performance of the interfacing event may not be altered by the user;

retrieving, in response to the received input signal, a simulation program and carrying out simulation operations according to the simulation program; and resuming, under system control and without user input, automatic identification of action commands for a next internally determined interfacing event and performing said next interfacing event to continue an execution path determined and controlled by the system sequentially using action commands in the interface file.

* * * * *